(12) United States Patent
Khojastepour et al.

(10) Patent No.: US 11,743,744 B2
(45) Date of Patent: *Aug. 29, 2023

(54) MULTI-USER BEAM ALIGNMENT AND OPTIMALITY OF CLASS OF EXHAUSTIVE SEARCH ALGORITHMS IN MULTI-PATH ENVIRONMENT

(71) Applicant: NEC Laboratories America, Inc., Princeton, NJ (US)

(72) Inventors: Mohammad Khojastepour, Lawrenceville, NJ (US); Shahram Shahsavari, Waterloo (CA)

(73) Assignee: NEC Corporation

( * ) Notice: Subject to any disclaimer, the term of this patent is extended or adjusted under 35 U.S.C. 154(b) by 234 days.

This patent is subject to a terminal disclaimer.

(21) Appl. No.: 17/317,123

(22) Filed: May 11, 2021

(65) Prior Publication Data
US 2021/0360434 A1 Nov. 18, 2021

Related U.S. Application Data

(60) Provisional application No. 63/024,614, filed on May 14, 2020.

(51) Int. Cl.
*H04L 43/12* (2022.01)
*H04W 16/28* (2009.01)
*H04W 24/08* (2009.01)

(52) U.S. Cl.
CPC .............. *H04W 16/28* (2013.01); *H04L 43/12* (2013.01); *H04W 24/08* (2013.01)

(58) Field of Classification Search
CPC ...... H04W 16/28; H04W 24/08; H04L 43/12; H04B 7/0617; H04B 7/0619; H04B 7/0695

See application file for complete search history.

(56) References Cited

U.S. PATENT DOCUMENTS

2016/0353467 A1* 12/2016 Nekovee ............. H04W 72/542
2017/0034733 A1*  2/2017 Sun .................... H04L 5/006
(Continued)

OTHER PUBLICATIONS

Klautau, Aldebaro, et al., "5G MIMO Data for Machine Learning: Application to Beam-Selection Using Deep Learning", In2018 Information Theory and Applications Workshop (ITA), IEEE. Feb. 11, 2018, pp. 1-9.

(Continued)

*Primary Examiner* — Hassan Kizou
*Assistant Examiner* — Hector Reyes
(74) *Attorney, Agent, or Firm* — Joseph Kolodka (57) ABSTRACT

A computer-implemented method is provided for finding a data transmission beam from an Access Point (AP) to a User Equipment (UE) in a communication system. The method includes selecting a probing beam from a set of probing beams. The method further includes sending a plurality of probing packets from the AP to the UE using a dedicated probing beam selected for each probing packet from among the set of probing beams. The method also includes receiving feedback from the UE regarding the plurality of probing packets. The method additionally includes computing the data transmission beam based on the received feedback and the set of probing beams.

18 Claims, 5 Drawing Sheets

(56) References Cited

U.S. PATENT DOCUMENTS

2019/0124610 A1* 4/2019 Stirling-Gallacher ....................... H04B 7/0617
2020/0259542 A1* 8/2020 Zhang .................. H04B 7/0695

OTHER PUBLICATIONS

Shahsavari, Shahram, et al., "Beam Training Optimization in Millimeter-Wave Systems Under Beamwidth, Modulation and Coding Constraints", In2019 IEEE 30th Annual International Symposium on Personal, Indoor and Mobile Radio Communications (PIMRC), IEEE. Sep. 8, 2019, pp. 1-7.

Shahsavari, Shahram, et al., "Robust Beam Tracking and Data Communication in Millimeter Wave Mobile Networks", In2019 International Symposium on Modeling and Optimization in Mobile, Ad Hoc, and Wireless Networks (WiOPT), IEEE. Jun. 3, 2019, pp. 1-8.

Igbafe, Orikumhi, et al., "Location-Aware Beam Alignment for mmWave Communications", arXiv preprint arXiv:1907.02197, vol. 1. Jul. 4, 2019, pp. 1-30.

Abbas Khalili et al., On Optimal Multi-User Beam Alignment in Millimeter Wave Wireless Systems:, arXiv:2001.06595v1 [cs.IT], pp. 1-6, Jan. 2020 (abstract and pp. 1-6).

Shahram Shahsavari et al., Robust Beam Tracking and Data Communication in Millimeter Wave Mobile Networks', 2019 International Symposium on Modeling and Optimization in Mobile, Ad Hoc, and Wireless Networks (WiOPT), 2019, DOI:10.23919/WiOPT47501.2019.9144146 [Retrieved on Jun. 29, 2021], Retrieved from the Internet: <URL: http://dl.ifip.org/db/conf/wiopt/wiopt2019/1570517236.pdf> (abstract; pp. 1-8; and figure 3).

* cited by examiner

MULTI-USER BEAM ALIGNMENT AND OPTIMALITY OF CLASS OF EXHAUSTIVE SEARCH ALGORITHMS IN MULTI-PATH ENVIRONMENT

RELATED APPLICATION INFORMATION

This application claims priority to U.S. Provisional Patent Application No. 63/024,614, filed on May 14, 2020, incorporated herein by reference in its entirety.

BACKGROUND

Technical Field

The present invention relates to wireless communications and more particularly to multi-user beam alignment and optimality of class of exhaustive search algorithms in a multi-path environment.

Description of the Related Art

Directional transmission patterns (a.k.a. narrow beams) are the key to wireless communications in millimeter wave (mmWave) frequency bands which suffer from high path loss and severe shadowing. In addition, the propagation channel in mmWave frequencies incorporates only a few number of spatial clusters requiring a procedure to align the corresponding narrow beams with the angle of departure (AoD) of the channel clusters.

SUMMARY

According to aspects of the present invention, a computer-implemented method is provided for finding a data transmission beam from an Access Point (AP) to a User Equipment (UE) in a communication system. The method includes selecting a probing beam from a set of probing beams. The method further includes sending a plurality of probing packets from the AP to the UE using a dedicated probing beam selected for each probing packet from among the set of probing beams. The method also includes receiving feedback from the UE regarding the plurality of probing packets. The method additionally includes computing the data transmission beam based on the received feedback and the set of probing beams.

According to other aspects of the present invention, a base station is provided for finding a data transmission beam from an Access Point (AP) to a User Equipment (UE) in a communication system. The base station includes a memory device for storing program code. The base station further includes a processor device operatively coupled to the memory device for running the program code to select a probing beam from a set of probing beams. The processor device further runs the program code to send a plurality of probing packets from the AP to the UE using a dedicated probing beam selected for each probing packet from among the set of probing beams. The processor device also runs the program code to receive feedback from the UE regarding the plurality of probing packets. The processor device additionally runs the program code to compute the data transmission beam based on the received feedback and the set of probing beams.

These and other features and advantages will become apparent from the following detailed description of illustrative embodiments thereof, which is to be read in connection with the accompanying drawings.

BRIEF DESCRIPTION OF DRAWINGS

The disclosure will provide details in the following description of preferred embodiments with reference to the following figures wherein.

DETAILED DESCRIPTION OF PREFERRED EMBODIMENTS

Embodiments of the present invention are directed to multi-user beam alignment and optimality of class of exhaustive search algorithms in a multi-path environment.

Embodiments of the present invention use a procedure called beam alignment (BA), where the objective of this procedure is to increase the beamforming gain for subsequent data communication. Prior art has focused on a channel with single AoD. Embodiments of the present invention are optimized BA strategies which consider multiple resolvable paths for the channel.

Figure 1:
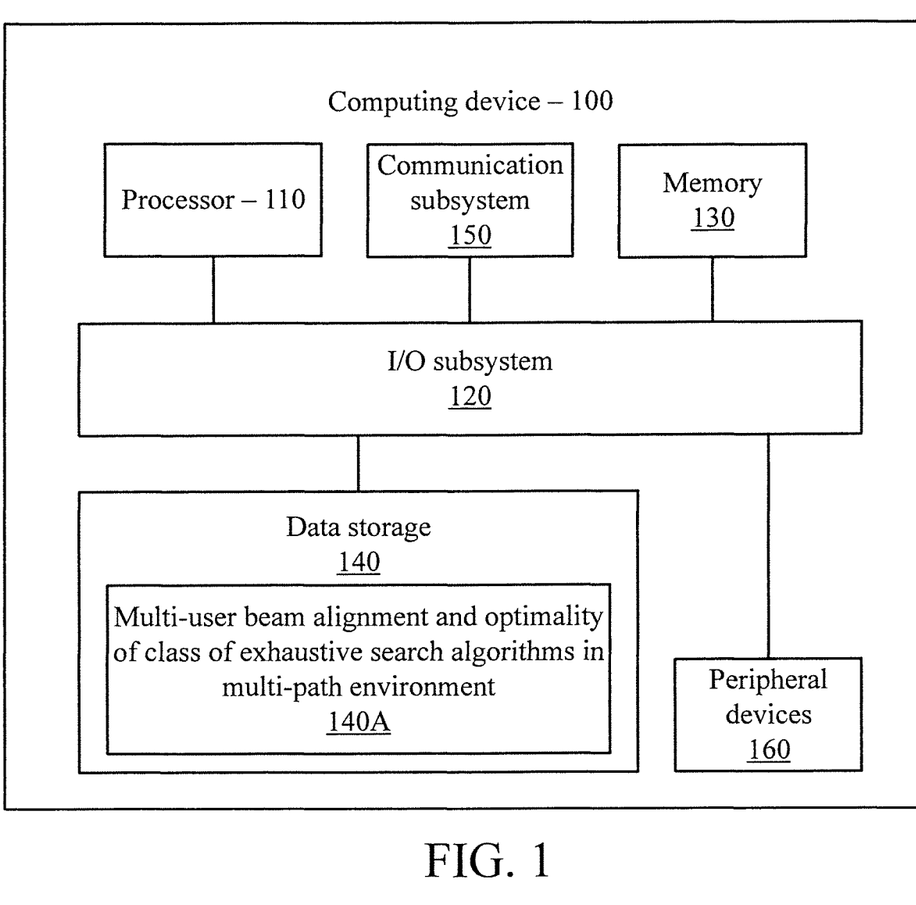
FIG. 1 is a block diagram showing an exemplary computing device, in accordance with an embodiment of the present invention.

FIG. 1 is a block diagram showing an exemplary computing device 100, in accordance with an embodiment of the present invention. The computing device can be in a base station of a cellular communication system. The computing device 100 is configured to perform multi-user beam alignment and optimality of class of exhaustive search algorithms in a multi-path environment.

The computing device 100 may be embodied as any type of computation or computer device capable of performing the functions described herein, including, without limitation, a computer, a server, a rack based server, a blade server, a workstation, a desktop computer, a laptop computer, a notebook computer, a tablet computer, a mobile computing device, a wearable computing device, a network appliance, a web appliance, a distributed computing system, a processor-based system, and/or a consumer electronic device. Additionally or alternatively, the computing device 100 may be embodied as a one or more compute sleds, memory sleds, or other racks, sleds, computing chassis, or other components of a physically disaggregated computing device. As shown in FIG. 1, the computing device 100 illustratively includes the processor 110, an input/output subsystem 120, a memory 130, a data storage device 140, and a communication subsystem 150, and/or other components and devices commonly found in a server or similar computing device. Of course, the computing device 100 may include other or additional components, such as those commonly found in a server computer (e.g., various input/output devices), in other embodiments. Additionally, in some embodiments, one or more of the illustrative components may be incorporated in, or otherwise form a portion of, another component. For example, the memory 130, or portions thereof, may be incorporated in the processor 110 in some embodiments.

The processor 110 may be embodied as any type of processor capable of performing the functions described herein. The processor 110 may be embodied as a single processor, multiple processors, a Central Processing Unit(s) (CPU(s)), a Graphics Processing Unit(s) (GPU(s)), a single or multi-core processor(s), a digital signal processor(s), a microcontroller(s), or other processor(s) or processing/controlling circuit(s).

The memory 130 may be embodied as any type of volatile or non-volatile memory or data storage capable of performing the functions described herein. In operation, the memory 130 may store various data and software used during operation of the computing device 100, such as operating systems, applications, programs, libraries, and drivers. The memory 130 is communicatively coupled to the processor 110 via the I/O subsystem 120, which may be embodied as circuitry and/or components to facilitate input/output operations with the processor 110 the memory 130, and other components of the computing device 100. For example, the I/O subsystem 120 may be embodied as, or otherwise include, memory controller hubs, input/output control hubs, platform controller hubs, integrated control circuitry, firmware devices, communication links (e.g., point-to-point links, bus links, wires, cables, light guides, printed circuit board traces, etc.) and/or other components and subsystems to facilitate the input/output operations. In some embodiments, the I/O subsystem 120 may form a portion of a system-on-a-chip (SOC) and be incorporated, along with the processor 110, the memory 130, and other components of the computing device 100, on a single integrated circuit chip.

The data storage device 140 may be embodied as any type of device or devices configured for short-term or long-term storage of data such as, for example, memory devices and circuits, memory cards, hard disk drives, solid state drives, or other data storage devices. The data storage device 140 can store program code for multi-user beam alignment and optimality of class of exhaustive search algorithms in multi-path environment. The communication subsystem 150 of the computing device 100 may be embodied as any network interface controller or other communication circuit, device, or collection thereof, capable of enabling communications between the computing device 100 and other remote devices over a network. The communication subsystem 150 may be configured to use any one or more communication technology (e.g., wired or wireless communications) and associated protocols (e.g., Ethernet, InfiniBand®, Bluetooth®, Wi-Fi®, WiMAX, etc.) to effect such communication.

As shown, the computing device 100 may also include one or more peripheral devices 160. The peripheral devices 160 may include any number of additional input/output devices, interface devices, and/or other peripheral devices. For example, in some embodiments, the peripheral devices 160 may include a display, touch screen, graphics circuitry, keyboard, mouse, speaker system, microphone, network interface, and/or other input/output devices, interface devices, and/or peripheral devices.

Of course, the computing device 100 may also include other elements (not shown), as readily contemplated by one of skill in the art, as well as omit certain elements. For example, various other input devices and/or output devices can be included in computing device 100, depending upon the particular implementation of the same, as readily understood by one of ordinary skill in the art. For example, various types of wireless and/or wired input and/or output devices can be used. Moreover, additional processors, controllers, memories, and so forth, in various configurations can also be utilized. These and other variations of the processing system 100 are readily contemplated by one of ordinary skill in the art given the teachings of the present invention provided herein.

As employed herein, the term "hardware processor subsystem" or "hardware processor" can refer to a processor, memory (including RAM, cache(s), and so forth), software (including memory management software) or combinations thereof that cooperate to perform one or more specific tasks. In useful embodiments, the hardware processor subsystem can include one or more data processing elements (e.g., logic circuits, processing circuits, instruction execution devices, etc.). The one or more data processing elements can be included in a central processing unit, a graphics processing unit, and/or a separate processor- or computing element-based controller (e.g., logic gates, etc.). The hardware processor subsystem can include one or more on-board memories (e.g., caches, dedicated memory arrays, read only memory, etc.). In some embodiments, the hardware processor subsystem can include one or more memories that can be on or off board or that can be dedicated for use by the hardware processor subsystem (e.g., ROM, RAM, basic input/output system (BIOS), etc.).

In some embodiments, the hardware processor subsystem can include and execute one or more software elements. The one or more software elements can include an operating system and/or one or more applications and/or specific code to achieve a specified result.

In other embodiments, the hardware processor subsystem can include dedicated, specialized circuitry that performs one or more electronic processing functions to achieve a specified result. Such circuitry can include one or more application-specific integrated circuits (ASICs), FPGAs, and/or PLAs.

Figure 2:
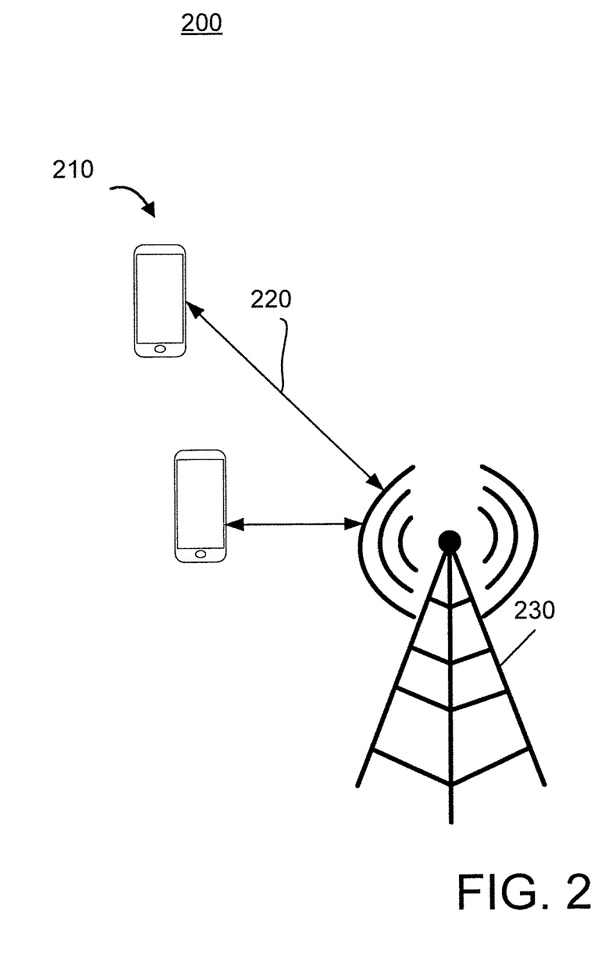
FIG. 2 is a block diagram showing an exemplary environment to which the present invention can be applied, in accordance with an embodiment of the present invention.

These and other variations of a hardware processor subsystem are also contemplated in accordance with embodiments of the present invention FIG. 2 is a block diagram showing an exemplary environment 200 to which the present invention can be applied, in accordance with an embodiment of the present invention. The environment 200 is representative of a cellular network to which the present invention can be applied. The elements shown relative to FIG. 2 are set forth for the sake of illustration. However, it is to be appreciated that the present invention can be applied to other network configurations as readily contemplated by one of ordinary skill in the art given the teachings of the present invention provided herein, while maintaining the spirit of the present invention.

The environment 200 may include a user equipment (UE) 210. In one embodiment, the UE 210 may be a cellphone. In another embodiment, the UE 210 may be a tablet, laptop, or other device that can use a wireless connection. The UE 210 may send data and information over a communication link 220. The communication link 220 may include a cellular based or a WIFI based link. The UE 210 is communicating with a cellular tower 230 (which can be considered an access point).

Figure 3:
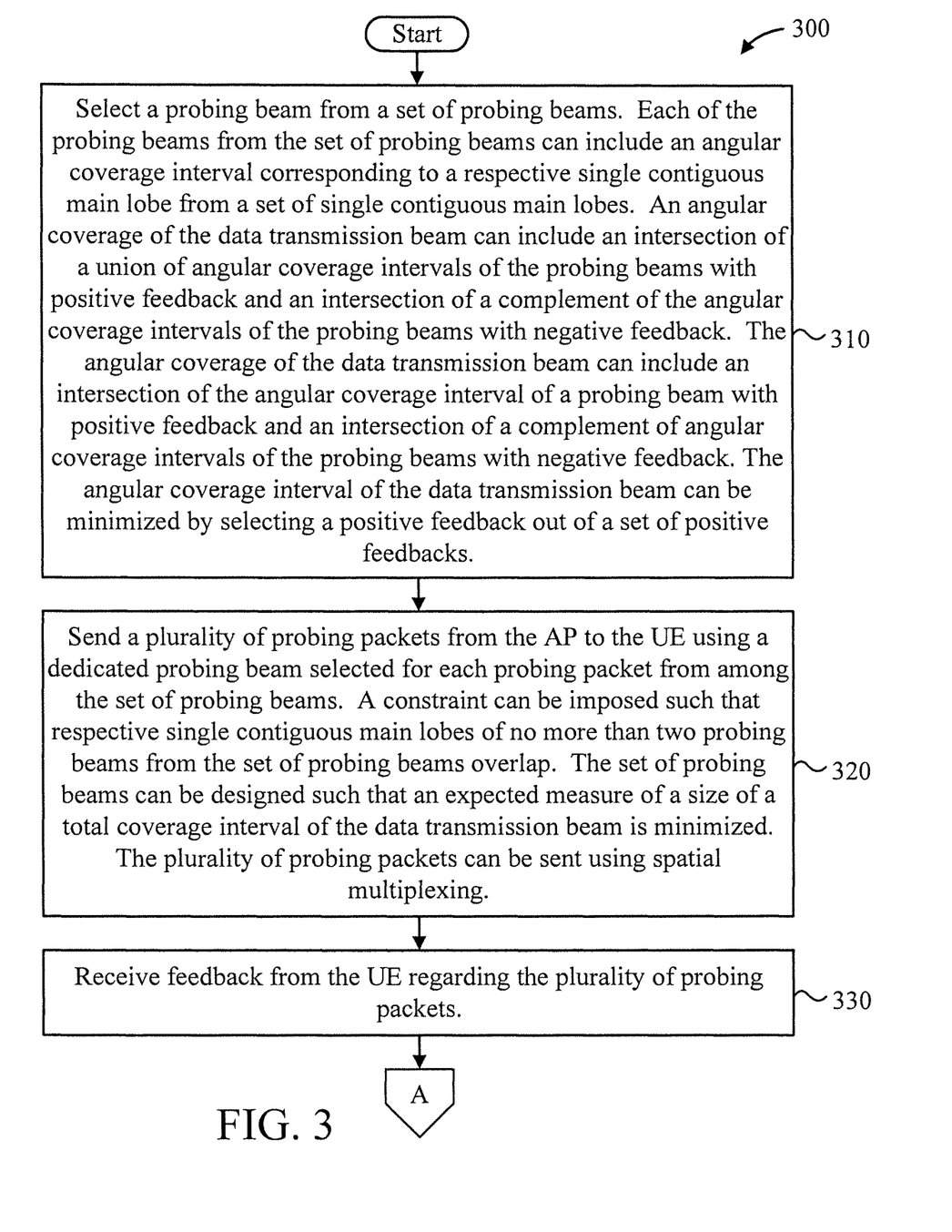
FIGS. 3-4 is a flow diagram showing an exemplary method for finding a data transmission beam from an Access Point (AP) to a User Equipment (UE) in a communication system.
Figure 4:
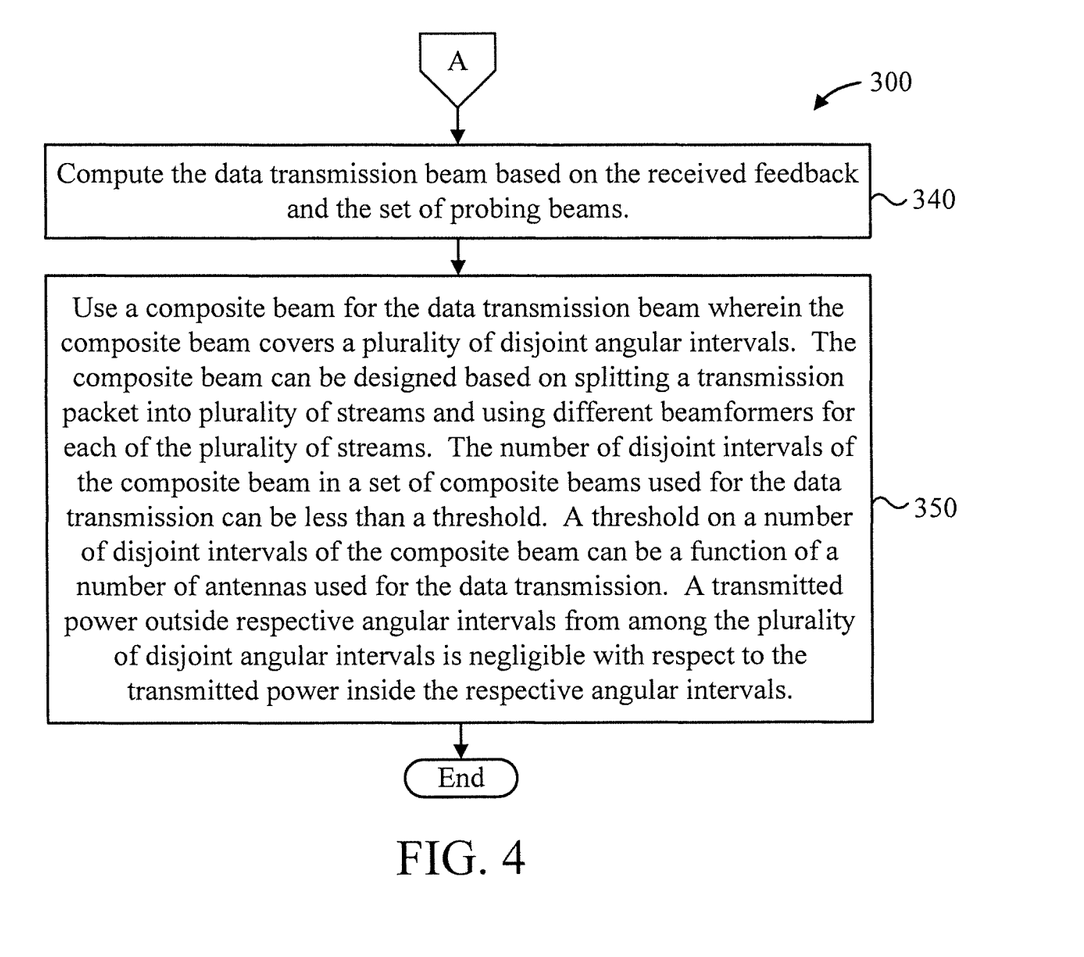

FIGS. 3-4 is a flow diagram showing an exemplary method 300 for finding a data transmission beam from an Access Point (AP) to a User Equipment (UE) in a communication system.

At block 310, select a probing beam from a set of probing beams. In an embodiment, each of the probing beams from the set of probing beams can include an angular coverage interval corresponding to a respective single contiguous main lobe from a set of single contiguous main lobes. In an embodiment, an angular coverage of the data transmission beam can include an intersection of a union of angular coverage intervals of the probing beams with positive feedback and an intersection of a complement of the angular coverage intervals of the probing beams with negative feedback. In an embodiment, the angular coverage of the data transmission beam can include an intersection of the angular coverage interval of a probing beam with positive feedback and an intersection of a complement of angular coverage intervals of the probing beams with negative feedback. In an embodiment, the angular coverage interval of the data transmission beam can be minimized by selecting a positive feedback out of a set of positive feedbacks.

At block 320, send a plurality of probing packets from the AP to the UE using a dedicated probing beam selected for each probing packet from among the set of probing beams. In an embodiment, a constraint can be imposed such that respective single contiguous main lobes of no more than two probing beams from the set of probing beams overlap. In an embodiment, the set of probing beams can be designed such that an expected measure of a size of a total coverage interval of the data transmission beam is minimized. In an embodiment, the plurality of probing packets can be sent using spatial multiplexing.

At block 330, receive feedback from the UE regarding the plurality of probing packets.

At block 340, compute the data transmission beam based on the received feedback and the set of probing beams.

At block 350, use a composite beam for the data transmission beam wherein the composite beam covers a plurality of disjoint angular intervals. In an embodiment, the composite beam can be designed based on splitting a transmission packet into plurality of streams and using different beamformers for each of the plurality of streams. In an embodiment, the number of disjoint intervals of the composite beam in a set of composite beams used for the data transmission can be less than a threshold. In an embodiment, a threshold on a number of disjoint intervals of the composite beam can be a function of a number of antennas used for the data transmission. In an embodiment, a transmitted power outside respective angular intervals from among the plurality of disjoint angular intervals is negligible with respect to the transmitted power inside the respective angular intervals.

A description will now be given of the system model and preliminaries.

The downlink is considered a single-cell mmWave scenario with one base station (BS) and an arbitrary number of users (UEs), say N users. The number of users may or may not be known. For simplicity of presentation, a two-dimensional space is considered corresponding to the location of the users in the azimuth plane around the BS. However, the results can be generalized for three-dimensional space by incorporating the elevations as well. Multi-path is considered in the wireless channel between the BS and UEs in the beam alignment which is one of the major differences with the prior art. Inspired by several channel measurement studies, it is presumed that the mmWave propagation channel between the BS and the users includes maximum p paths (a.k.a spatial clusters). In a robust design the number of paths p may be unknown.

Some prior studies on mmWave BA have considered a single dominant path for the mmWave channel. However, various experimental studies have shown the possibility of having multiple comparable paths in indoor and outdoor scenarios which can be exploited to combat blockage, i.e., a secondary path can be used if the primary path is blocked.

Channel Model

It is presumed that the channels are stationary in the time interval of interest. Let $\Psi_j$, $j \in [N]^1$ denote the vector of random AoDs corresponding to the spatial clusters in channel from the BS to the $j^{th}$ user, where $\Psi_j = [\psi_{1j}, \psi_{2j}, \ldots ]$, and $\psi_{ij}$ is the AoD of the $i^{th}$ path. In embodiment, an arbitrary probability distribution function (PDF) $f_{\Psi_j}$ $(\psi_{1j}, \ldots, \psi_{pj})$ for $\Psi_j$ over $(0, 2\pi]^p$ is considered for a channel with maximum p resolvable paths. This distribution reflects the prior knowledge about the AoD, which, for example, could correspond to the previously localized AoD in beam tracking applications. The correlation between the users paths may also be modeled in the distribution. On the other hand, this distribution may be enforced even where no prior knowledge about the user paths is known in order to perform scheduled search over different AoD angles in which case the enforced probability distribution may be interpreted as the priority function in the search space.

Let us expand on the use of probability distribution. For example, a system (SDR) may start with no prior knowledge, i.e., uniform distribution. Although in each frame there is no interaction between the feedback and the beam search algorithm, in the next frame, the beam search algorithm can use the knowledge acquired in the previous frames about the user. This information or knowledge may include the number of colliding users in a given beam or entries of UR, i.e., $u_k$, (cannot use the partition) (discrete possibilities of the UR, could be defined as entries of UR codebook) (or amount of interference seen). The interference may be estimated based on the feedback slot as described later. The use of such pdf may be simplified by digitization. For example, a threshold may be used to cut the search domain based on the value of pdf being above this threshold.

It is noted that resolvable paths are usually limited in numbers particularly in mmWave bands. The power profile of such resolvable paths across the azimuth and elevation angle depends on the environment, nonetheless, it is usually possible to assume that the set of resolvable path (paths with enough power to be useful for communication or at least detectable) follow a power profile which has considerable (at least 3 dB or more) power difference between each set of mutual paths. Therefore, resolvable paths are the paths between a transmitter and a receiver that may not become undetectable due to the superposition. However, the superposition of the signals received through multiple such resolvable path may experience fluctuations in power.

Beamforming/Precoding

In one or more embodiments, it is presumed that the BS has a large antenna array as envisioned for mmWave communications, which allows a particular beam resolution to be achieved while the user has an omni-directional transmission and reception pattern for the BA phase. Furthermore, the present invention considers a single RF chain along with analog BF at the BS due to practical considerations such as power consumption. It is possible to superimpose multiple beams to generate a composite beams which covers multiple directions. Such composite beams may be excited simultaneously through a single stream transmission. The design of such beams for transmission of multiple (orthogonal) streams may not be directly usable for transmission of single streams. To model the directionality of the BS transmission due to BF, a sectored antenna model is adopted that is characterized by the following two parameters: a constant mainlobe gain; and the angular coverage region (ACR) which is the union of the angular interval(s) covered by the mainlobe. The effect of the side-lobes is neglected. While this ideal model is considered for theoretical tractability, modifications may be applied to generalize the antenna model for practical scenarios where the beam pattern roll-off is not sharp.

Alternatively, one may use two layer beamforming when the first layer is a digital beamforming layer which comprises multiple streams that are combined into a single stream that is transmitted through analog beamforming. A user may receive one or more of such multiple streams. The digital beamforming for each of the multiple streams may choose the beamforming vector based on the user feedback. The analog beamformer may be chosen based on a single or collection of the feedback for multiple users. In other word, a composite or non-composite beam may be generated for the analog beamforming which encompasses the directions for multiple users.

Frames and Feedback

Figure 5:
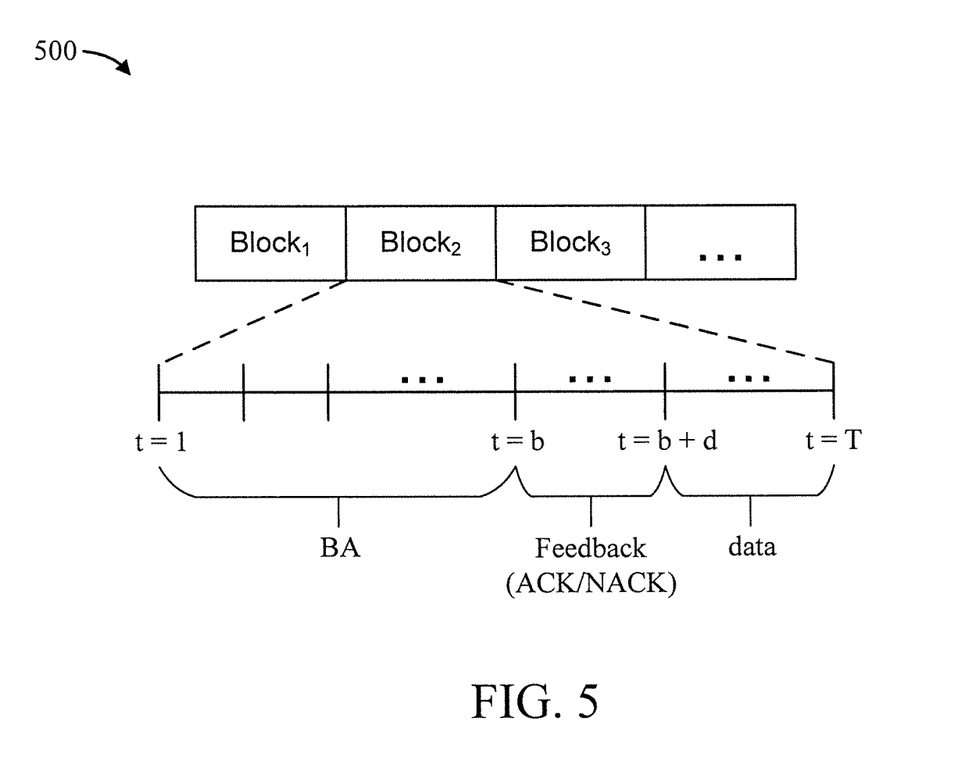
FIG. 5 is a block diagram showing an exemplary time slotted system, in accordance with an embodiment of the present invention.

In an embodiment, a time division duplex (TDD) protocol is considered in which a frame is divided into blocks of T time slots as depicted in FIG. 5. FIG. 5 is a block diagram showing an exemplary time slotted system 500, in accordance with an embodiment of the present invention. Motivated by practical constraints, the feedback from a user will be received after a d time slot delay. A Non Interactive Beam Alignment (NI-BA) scenario is considered where b time slots (called scanning time slots (STS) or probing time slots (PTS)) are used to scan the angular space and the feedback for all the packets is received after d+b time slots which includes the processing delays and propagation delay for the packets. Such NI-BA is especially useful in scenarios that the time delay d is relatively large. The pros of using the NI-BA scheme is that it can be used to simultaneously probe multiple users. Hence, the feedback for the users are received over l time slots (called the feedback time slots (FTS)) following the initial b+d slots. These l slots are allocated for the users' feedback where an individual feedback slot may be scheduled for a particular user or a set of users, say based on their ID, or it might be freely used by any user in random access mode. Finally, the rest of the T-b-l slots, called data transmission slots (DTS), are used for data communications which includes the d slots in which the BS is waiting to receive the users' feedback. Obviously, the d time slots where the BS waits to receive the feedback for the b probes that are sent in this frame may only be used for communication to the users for which the channel estimation and beam alignment has been previously performed or it can be used for communications which does not require such channel estimation such as broadcasting or multicasting.

It worth noting that the slot number used by the users for feedback could be a function of the feedback itself. For example, if b=4, this means that the possible set of ACK/NACK in the feedback may have at most 16 possibilities (some possibilities may be considered invalid for feedback). In such case, one may use l=16 slots where each slot corresponds to a particular feedback sequence of length 4. A feedback sequence is defined as a binary sequence $s=(s_1, s_2, \ldots, s_b)$ of length b where the ith position, $s_i$, corresponds to the feedback for the ith scanned beam or which the values 0 and 1 correspond to NACK and ACK, respectively. Since the goal of the user is to communicate the information content of the feedback sequence in its feedback, the user may choose one of the followings: (1) the user explicitly includes the feedback sequence in its feedback reply, or (2) the user implicitly indicate the feedback sequence by responding in a particular time slot that corresponds to a particular feedback sequence. The latter feedback scheme makes all the users that are sending the same feedback sequence to the base station contend on the same time slot or resource block. There are different benefits in the latter feedback scheme. First, the feedback from multiple UEs in a highly populated partition would not affect the reception of feedback from UEs in other partitions since different partition would have different feedback sequences. This is particularly helpful when a particular probability distribution, e.g., to segment the search space, is imposed (or enforced). Second, identifying that a multiple feedback have been received and are interfering in a time slot (which may comprise estimating the number of such interfering feedback) can be used to streamline the search by further dividing those partitions which have large number of collisions.

Scanning Beams and Data Transmission Beams

Herein, a BA scheme phase is considered in order to estimate the users' AoDs such that narrower beams (which are translated to higher BF gains) can be used to serve the users during data communication phase. The localization or estimation of the user AoDs is within a discrete set of intervals which in turn are based on the set of beams that are used on STS. At each time slot i∈[b] during the STS in BA phase, the BS transmits a probing packet using a beam with ACR $\phi_i$ to scan that angular region while the users are silent during the first b time slots that are the probing or scanning time slots (STS). The beam $\phi_i$ is called a scanning beam (SB) and the set of beam $\{\Phi_i, i \in [b]\}$ is called the set of SBs. In the l FTS, the users send their feedback message to the BS (e.g., through low-frequency control channels, or in the time slots that are predetermined by the BS). The feedback message includes the indices of the beams whose corresponding probing packets are received and those which are not received by the user. Therefore, this feedback message can determine if an AoD associated with a resolvable path of the user belongs to the ACR of a given beam in which case it is considered as an acknowledgment (ACK). The feedback can also determine if no AoD for any resolvable path of the user belongs to the ACR for a given beam which is considered as negative acknowledgement (NACK). Herein, it is presumed that the packets used for scanning during BA are received without noise at the users. Also, it is presumed that the feedback received at the BS is without any error. Nonetheless, the algorithm may be used with the error in feedback or reception of probing packets and generalization of the results is straight forward.

The BS then chooses a data transmission beam (DTB) for transmission in DTS as a function of the received feedback and the set of SBs. This function captures different BA strategies and hence is referred to as policy. A policy is defined as a function from the set of feedback sequences onto the set of DTB. For any BA strategy with a given set of scanning beams $\{\Phi_i\}_{i=1}^{b}$, the set of data transmission beams (DTB) $\mathcal{U} = \{u_k\}_{k=1}^{M}$ is defined the range of the policy function.

Define $W_A = \cap_{i \in A} \Phi_i \cup_{A \subset B \subset C[b], A \neq B} \cap_{i \in B} \Phi_i$, $A \subset [b]$. The set $W_A$ for all $A \subset [b]$ define the set of component beams (CB) since any two CBs are disjoint, i.e., $W_A \cap W_B = \emptyset$ for all $A \neq B$, and any SB $\Phi_i$ may be written as $\Phi_i = \cup_{A, i \in A} w_A$ for all $i \in [b]$. Clearly, there is a one-to-one correspondence between set of CBs $C = \{w_a, A \subset [b]\}$ and the set of SB $B = \{\Phi_i, i \in [b]\}$. Hence, a policy may be equivalently defined as a function $\mathcal{P} : B, 2^b \rightarrow \mathcal{U}$, or $\mathcal{P} : C, 2^b \rightarrow \mathcal{U}$ where $2^b$ is the set of all possible feedback sequences. Note that the number of possible DTBs $M \leq 2^b$ for a feedback sequence of length b and the exact value of M depends on the policy.

It is noted that if the union of all SB does not cover (i.e., is not equal to) the search domain D, inclusion of the all-zero feedback sequence in the support of a policy is meaningful only if the number of users within the search domain is known. For example if it is known there is one user in the search space and the all-zero feedback sequence is received, it can be concluded that the user is in the part of the search domain that has not been scanned, i.e., $\mathcal{D}-\cup_{i\in[b]}\Psi_i$. However, such inferred DTB for the user comes without any possible signal reception by the user which means that the BA strategy is unaware of the channel quality for such beam. This is in contrast to the possible measurement based on the received signal, e.g., signal strength, by the user for the decoded packets received in a given SB. Such signal quality measurement may constitute a channel estimate that can be indicated in the user feedback to the BS.

Nonetheless, the feedback policy may include explicit transmission of all-zero feedback sequence by the user in which case the existence of the user may be inferred though such transmission without prior knowledge of the number of the users within the search domain. However, this scenario assumes a different signaling that indicates the timing of user feedback in the form of scheduled slot, or random access slot.

Policy

Based on the feedback, the BS infers an UR for the AoD of the channel of each user. During the DTS, a beam with an ACR covering the UR is used. The main difference in BA strategies comes from the rule so called policy which computes the DTB based on the SB and the received feedback.

Here, two policies are defined as follows: diversity (DS) policy and beamforming (BF) policy. Diversity policy aims to minimize the angular span of the DTB while covering all possible angles that may contain a resolvable path. On the other hand, beamforming policy aims to increase the beamforming gain by further reducing the angular span of the DTB to cover at least one resolvable path (but not necessarily all the resolvable paths). It is noted that a policy may also be a function of other feedback signals received from the user such as the signal strength or indication of the channel qualities for different beams.

The DS policy is beneficial to maintain the connection if one or some of the paths are blocked as long as at least one of the paths is still resolvable and it is not blocked. However, the DTB in DS policy has generally larger angular span and hence is lower in the beamforming gain it provides. The BF policy, on the other hand, usually provides much higher BF gain but it may suffer from the blockage. Hence, both policies have important properties and may be useful in different scenarios to tradeoff between the connectivity and the quality of the connection in terms of beamforming gain.

For DS policy, B(s) is defined as the UR of AoD of user j with feedback sequence s which is the minimum angular span (possibly non-contiguous) that includes all resolvable paths of the user j. For the BF policy, a notion minimal uncertainty region (UR) is considered that includes at least one resolvable path (denoted by $B_1$(s)) instead of the minimal UR which includes all resolvable paths (i.e., B(s)). In the following, B(s) and $B_1$(s) are first derived where the knowledge about the maximum number of path is not available.

1) Multipath: Considering multipath channels, i.e., where the user channel has multiple resolvable paths (i.e., 2 or more path), the positive feedback (ACK) for the beam $\Phi_i$ means that it has at least one resolvable path, hence B($\Psi_j$, s)∩$\Phi_i$ has at least one resolvable path. On the other hand, a negative feedback (NACK) for the beam $\Phi_i$ means that $\Phi_i$ contains no resolvable path which means that B($\Psi_j$, s)∩$\Phi_i$ has no resolvable path. This means that B($\Psi_j$, s)∈D−$\Phi_i$. Therefore, for the UR for the user j, the following applies $$B(s)=(\cup_{i\in S_A(s)}\Theta_i(s))\cap(\cap_{i\in S_N(s)}\Theta_i(s)), \qquad (1)$$

where s is the received feedback sequence and $\Theta_i$(s)=$\Phi_i$ if ACK is received for the SB i, e.g., if the bit i of s is set, and $\Theta_i$(s)=D−$\Phi_i$ otherwise (NACK). It is noted that the domain D might be as large as [0,2π). The set of $\{\Theta_i(s)\}_{i=1}^{b}$ can be found based on the feedback sequence. For a feedback sequence s, let $S_A$(s) and $S_N$(s) denote the indices of the beams for which an ACK and NACK is received, respectively.

It is sometime useful to consider a notion minimal uncertainty region (UR) that contains at least one resolvable path denoted by $B_1$(s). Since a positive feedback (ACK) for the beam $\Phi_k$ means that it has at least one resolvable path and a negative feedback (NACK) for the beam $\Phi_i$ means that $\Phi_i$ contains no resolvable path, the beam $\Theta_k(s)\cap(\cap_{i\in S_N(s)}\Theta_i(s))$ still contains one resolvable path. Hence, it is enough to find the index of k which results in the beam with smallest angular span. The following applies:

$$B_1(s) = \Theta_k(s) \cap \left(\bigcap_{i\in S_N(s)} \Theta_i(s)\right), \qquad (2)$$

$$k = \underset{j\in S_A(s)}{\operatorname{argmin}} |\Theta_j(s)) \cap \left(\bigcap_{i\in S_N(s)} \Theta_i(s)\right)|, \qquad (3)$$

where |Φ| denotes the angular span or size of the beam Φ and s is the received feedback sequence.

The expression for both BF policy and DS policy are derived for multipath where the knowledge of the number of the path is not available. However, they can be applied to any scenario even if the number of path is known. In the following remarks, it is clarified that there could be specific policies defined where the maximum number of the path is known. Examples are provided which show that different expressions may be obtained for either policies where the maximum number of paths is known.

Remark 1. For the BF policy, if the maximum number of paths, say p, is known, the angular span or size of $B_1(\Psi_j)$ for some feedback sequence may be even smaller than the one obtained in (2). With an abuse of notation, let the component beam $w_A$ for a set A be written by directly specifying the elements of the set A in the subscript of w, e.g., $w_{\{12\}}$ is equivalently written as $w_{12}$. Consider the case where the maximum number of path p=2 and there are three beams $\emptyset_i$, i∈{1, 2, 3} such that $w_{\{12\}}=w_{\{13\}}=w_{\{23\}}=\emptyset$, and $w_{\{123\}}\neq\emptyset$. All positive feedback sequence, i.e., with $S_A$={1, 2, 3}, means that there is a path in either of $\Phi_i$, i∈$S_A$, which means that at least one resolvable path is in $\Phi_1\cap\Phi_2\Phi_3=w_{\{123\}}$ which could have smaller angular span than the one stated by (2).

For the DS policy, if the maximum number of paths, say p, is known, the angular span or size of $B_1(\Psi_j)$ for some feedback sequence may be even smaller than the one obtained in (1). Consider the maximum number of path p=2 and $S_A$={1, 2, 3, 4} such that $w_{\{12\}}\neq\emptyset$, $w_{\{34\}}\neq\emptyset$ and $w_{\{13\}}=w_{\{14\}}=w_{\{23\}}=w_{\{24\}}=w_{\{123\}}=w_{\{124\}}=w_{\{134\}}=w_{\{234\}}=w_{\{1234\}}=\emptyset$. All positive feedback sequence means that there is a path in either of $\Phi_i$, i∈$S_A$, which means that there has to be exactly one resolvable path in either of $w_{\{12\}}$ or $w_{\{34\}}$. Hence, the UR which contains all the paths could be as small as $B_{(s)}=w_{\{12\}}\cup w_{\{34\}}$ which could have smaller angular span than the one stated by (1).

It is noted that in general the set of DTBs U=$\{u_k\}_{k=1}^{M}$ defined the set of all possible values of B(s) in (1) for DS policy or $B_1(s)$ in (2) for BF policy. The set of DTBs U in general is not a partitioning of the search domain D. However, in the following, a special case is considered of the channel model with only single path (could be interpreted as single dominant path) where (1) both DS and BF policies coincide and become the same, and (2) the set of DTBs U partitions the domain $D^2$.

Single Dominant Path: If the channel of a user has a single dominant path, i.e., there is no multipath or it is negligible, then s contains at most one positive feedback, e.g., denoted by a binary feedback sequence with only single bit that is set to one and the rest of the bit as zero. Therefore, both DS and BF policy are identical and the corresponding DTB is given by $$B(s) = \cap_{i=1}^{b} \Theta_i(s), \qquad (4)$$

for the feedback sequence s.

This formulation relies on the fact that when there is only single path, (1) there is a single AoD for each user at the base station, (2) a positive feedback (ACK) for the beam $\Phi_i$ means that $b(s) \in \Phi_i$ and (3) a negative feedback (NACK) means that $B_{(s)} \in (0, 2\pi] - \Phi_i$.

Assuming that the channel of each user to BS has only one path (corresponding to a single AoD), it can be shown that $u_{k'}$ partition the search domain D, i.e., $u_k \cap u_{k'} = \emptyset$, $\forall k, k'$ and $\cup_{k=1}^{M} u_k = D$.

If the maximum number of paths, say p, is known, the angular span or size of $B_1(\psi_j)$ for some feedback sequence may be even smaller than the one obtained in (2). For example, consider p=2 and $S_A = \{1, 2, 3\}$ such that $\Phi_i \cap \Phi_j = \emptyset$, i, j$\in S_A$ and $\Phi_1 \cap \Phi_2 \cap \Phi_3 \neq \emptyset$. All positive feedback sequence means that there is a path in either of $\Phi_i$, $i \in S_A$, which means that at least one resolvable path is in $\Phi_1 \cap \Phi_2 \Phi_3$ which could have smaller angular span than the one stated by (2).

Problem Formation: Given a set of weights $\{c_j \geq 0\}_{j=1}^{N}$, $\Sigma_{j=1}^{N} c_j = 1$ for users and the set of DTBs U=$\{uk\}_{k=1}^{M}$, the weighted average of expected width of users' URs is defined as follows:

$$\overline{U}(B) = \Sigma_{j=1}^{N} c_j \mathbb{E}[|B(s)|], \qquad (5)$$

where, $$\mathbb{E}[|B(s)|] = \Sigma_{k=1}^{M} |u_k| \int_{\psi \in u_k} f\psi_j(\psi) d\psi, \qquad (6)$$

$$B(s) = u_k \text{ for } \psi \in u_k. \qquad (7)$$

and the expectation is taken over the feedback sequence s which is a function of the channel.

Note that $|u_k|$ is the Lebesgue measure of $u_k$, which would correspond to the total width of the intervals in case when $u_k$ is the union of a finite number of intervals. The dependence of $\overline{U}$ on B=$\{\Phi_i\}_{i=1}^{b}$ comes from the expectation which is a function of the set of DGTB U=$\{u_k\}_{k=1}^{M}$ created by B. The weights here could reflect priorities of the users, where the equal gain for all users, i.e., $c_j = 1/N$, $\forall j \in [N]$ representing the equal priority case. The objective is to design the scanning beams B=$\{\Phi_i\}_{i=1}^{b}$ for a given b to minimize the weighted average of expected width of users' URs defined in (5). In other words, the goal is to solve the following optimization problem:

$$B = \{\Phi_i^*\}_{i=1}^{b} = \underset{\{\Phi_i\}_{i=1}^{b}}{\operatorname{argmin}} \overline{U}(\{\Phi_i\}_{i=1}^{b}). \qquad (8)$$

Since the beams used for data communications cover the corresponding URs, the objective of the optimization is equivalent to minimizing the average of the scanning beams beamwidth used for data communications with users. In an embodiment, $\overline{U}^*$ is defined as the optimal objective value in optimization (8).

It is noted that in the above formulation, one may use the alternative definition $B_1(s)$ of UR for the user j based on the BF policy instead of $B(\psi_j)$ based on the DS policy in which case the corresponding objective function is denoted by $\overline{U}_1(.)$.

A closer examination of the multi-user NI-BA problem in (8) reveals that it can be translated to a single-user problem with a weighted prior knowledge $$f_{\psi(\psi)} = \Sigma_{j=1}^{N} c_j f\psi_j(\psi), \psi \in D. \qquad (9)$$

Hence, for the remainder hereinafter, the BA problem for one user with the PDF in (9) is only considered. It is straightforward to show that the optimal scanning beams in the optimization problem (8) are the ones that can generate an optimal partition $\{u^*_k\}_{k=1}^{M}$ such that $$\{u_k^*\}_{k=1}^{M} = \underset{u_k, k \in [M]}{\operatorname{argmin}} = \sum_{k=1}^{M} |u_k| P(\psi \in u_k) \qquad (10)$$

$$\text{s.t. } |u_k| \geq 0.$$

To bound $\overline{U}^*$, it is noted that the partition $\{u_k\}_{k=1}^{M}$ created by the beams used for scanning can be viewed as a set of quantization regions and the optimization in (10) is equivalent to designing a quantizer that minimizes the expected width (i.e., Lebesgue measure) of the partition $\{u_k\}_{k=1}^{M}$.

Herein, the design of b scanning beams $\{\Phi_i\}_{i=1}^{b}$ is considered by addressing different constraints: (1) whether the beams are composite or contiguous, (2) which one of $\overline{U}$ or $\overline{U}_1$ is used as an objective function, and (3) if multi-path is considered or not.

Properties of BA Strategies for DS and BF Policies

Here, results are provided on the properties of BA strategies based on both DS and BF policies. The problem of localizing the beam of multiple users in a common search space $D \subset (0, 2\pi]$ is considered. The generalization to the case where users have different search space is straight forward. For simplicity of discussion, p paths are considered with i.i.d distributions with a support that is equal to the search space D. Generalization to the case where the joint distribution is not i.i.d. is straight forward. The problem is formulized as the design of the SB set B in order to minimize the average DTB. Given a policy, the average DTB may be obtained based on the probability of receiving a given feedback sequence.

Without loss of generality, an all-zero feedback sequence is not considered, e.g., by designing the SB that cover the entire input domain or initial uncertainty region. The probability of a feedback sequence s where $S_A(s) = i$, i.e., it has only single element, is simply given $f(w_i)^p$ where $f(.)$ is the distribution of a single path. In other words, if and only if all the p paths happen in the same interval $w_i$, the feedback sequence has only single acknowledgement for the $i^{th}$ SB. The probability of a sequence which contains more than one acknowledgment the probability may be found through inclusion-exclusion principle. Let $A = S_A(s)$, and for any set A, $A^{(k)}$ denote the set of all subset of size k of the set A. The probability of receiving a feedback sequence s with an acknowledgement index set $A = S_A(s)$ denoted by $P_A$ can be expressed as $$P_A = \left(\sum_{C\ A} f(w_c)\right)^p - \sum_{B\ A^{(n-1)}} \left(\sum_{C\ B} f(w_c)\right)^p + \qquad (11)$$
$$\sum_{B\ A^{(n-2)}} \left(\sum_{C\ B} f(w_c)\right)^p - \ldots + (-1)^{(n+1)} \sum_{B\ A^{(1)}} \left(\sum_{C\ B} f(w_c)\right)^p$$

where n is the size of the set A, i.e., n=|A|.

Given the diversity policy defined in (1), the length of the beam for a sequence s with $A=S_A(s)$ denoted by $l_{DS}$. (A) can be found as $$l_{DS}(A) = \Sigma_{C\ A} l(w_c) \qquad (12)$$

where l(w) denotes the length of the w.

For the beamforming policy defined in (2), the length of the beam for a sequence s with $A=S_A(s)$ denoted by $l_{BF}(A)$ can be found as $$l_{BF}(A) = \min_{i \in [b]} \sum_{C\ B_i, B_i = A \cap I_i} l(w_c). \qquad (13)$$

The optimization problem for the diversity policy may be defined as $$\min_c \bar{l}_{DS} = \sum_{A\ [b]} l_{DS}(A) P_A \qquad (14)$$

In the following, uniform distribution for the pdf of a path is considered. The interval does not need to be contiguous and could be strict subset of $[0, 2\pi)$.

Definition 3. A set of SB (or CB) is called generalized exhaustive search (GES) if for any i and j, $\Phi_i \cap \Phi_j = \emptyset$.

Definition 4. A set of SB (or CB) is called exhaustive search (ES) or naïve exhaustive search if for any i and j, $\Phi_i \cap \Phi_j = \emptyset$ and $l(w_i) = l(w_j)$.

Theorem 5. The solution to the optimization problem (14) for b=2 and arbitrary p≥2 is the naïve exhaustive search (ES).

Proof. Let $w_A$ denote the size of $w_A$. With an abuse of notation, i.e., listing the element of a set in the index of $w_A$ and $w_A$ instead of the set A itself, the average DTB for the b=2 may be written as $$\bar{l}_{DS,b=2} = n(w_1^{p+1} + w_2^{p+1} + S_{12}(S_{12}^p - w_1^p - w_2^p)) \qquad (15)$$

where $S_{12} = w_1 + w_2 + w_{12}$, and n is a constant such that $nS_{12}^p = 1$ for a i.i.d pdf for p paths with uniform individual distributions. One can easily check that if $w_{12}$ is positive, by choosing either $w'_1 = w_1 + w_{12}$, $w'_2 = 0$ or $w'_1 = w_1$, $w'_2 = w_2 + w_{12}$, $w_{12} = 0$ the average DTB decreases. This proves that $w_{12} = 0$, hence, the solution is GES. In order to prove that the solution is ES by showing that $w_1$ one can write the derivatives of the average length with respect to $w_1$ as $$\bar{l}_{DS,b=2} = -n(p+1)w_1(1-w_1)(w_1^{p-1} - (1-w_1)^{p-1}) \qquad (16)$$

which is zero if and only if $w_1 = w_2 = \frac{1}{2}$, or when $w_1 = 0$ or $w_2 = \frac{1}{2}$.

Theorem 6. The solution to the optimization problem (14) for b=3 and p≥2 is GES.

Proof. The proof relies on a fact that for any set A if $w_A \neq 0$, there exist a directional derivative which is negative at that point. The following lemma is used that is the direct consequence of KKT conditions.

Lemma 7. The global solution to a multi-variable optimization problem occurs on the boundary if there exist a directional derivative that is nonzero for any point that does not lie on the boundary.

The simplicity that comes from this lemma is through finding a particular directional derivatives instead of considering the gradient. For the problem at hand, it can be directly verified that for any set A, $w_A \neq 0$ the at least one of the directional derivative $\partial \bar{l}_{DS}/\partial w_i - \partial \bar{l}_{DS}/\partial w_A$, i∈ A is negative.[3] Hence, it can be shown that at the optimal point $w_A = 0$, ∀A, |A|≥2 because if $w_A > 0$, there exist i such that $\partial \bar{l}_{DS}/\partial w_i - \partial \bar{l}_{DS}/\partial w_A < 0$ which means that the objective function becomes smaller by replacing $w_i$ and $w_A$ with $w_i + dw$ and $w_A - dw$, respectively. This means that the solution to (14) is GES. It is worth noting that, the solution is not necessarily ES. For example for the case of p=5, the optimal point is $w_1 = w_2 = 0.1874$, $w_3 = 0.6252$. This is an interesting example which has asymmetric optimal point of an optimization problem which is symmetric with respect to its variables, i.e., the objective function and the constraints are symmetric with respect to change of the variable indices.

It is conjectured that in general, the solution to beam alignment problem under diversity policy is always GES. The practical implication is that if one is interested in finding the smallest beams which covers all possible paths for a user, he would optimally use generalized exhaustive search beam designs. However, this result is for an initial search where no prior knowledge of the user pdf is available beside its support, i.e., the pdf is assumed to be uniform over its support. However, if the pdf is not uniform GES is not necessarily the solution anymore.

Remark 8. If the distribution of the user path is not uniform, GES is not necessarily optimal.

Conjecture 9. The solution to the optimization problem (14) for b≥2 and arbitrary p is the GES.

It is believed that even for large values of b, i.e., b>3 the condition $\partial \bar{l}_{DS}/\partial w_i - \partial \bar{l}_{DS}/\partial w_A < 0$ holds for an i∈ A. However, direct verification becomes exhaustively hard and alternative technique may prove/disprove the conjecture much easier.

As the number of path p goes to infinity, the $\bar{l}_{DS}$ approaches the length of domain, i.e., $l(D) = l(\cup_{i \in [b]} \Phi_i)$ irrespective of the choice of BS. Hence, the optimization problem becomes meaningless.

The optimization problem for the beamforming policy may be defined as $$\min_c \bar{l}_{BF} = \sum_{A \subset [b]} l_{BF}(A) P_A \qquad (17)$$

Remark 10. The solution to the optimization problem (17) is not GES.

It is shown that even for the simplest case of b=2, the solution is not in the form of GES for any arbitrary p≥2. The optimization problem may be written as $$\bar{l}_{BF,b=2} = n(w_1^{p+1} + w_2^{p+1} + (\min(w_1, w_2))(S_{12}^p - w_1^p - w_2^p)) \qquad (18)$$

or equivalently $$\bar{l}_{BF,b=2} = n(w_1^{p+1} + w_2^{p+1} + (1-w_2)(1/eta - w_1^p - w_2^p)) \qquad (19).$$

By assuming that $w_1 \leq w_2$, and $0 \leq w_1 + w_2 \times 1$. For example for p=2, the optimal value is equal to 0.46 obtained at $(w_1 w_2 w_{12}) = (0.27, 0.59, 0.14)$.

As the number of path p goes to infinity, the $\bar{l}_{BF}$ can approach zero if the length of the smallest beam in B approaches zero. This can be interpreted easily. However for infinite values of p, e.g., p=40 and small values of b, e.g., b=2, the minimum is about 10% of l(D) which is still very considerable.

Design of BA Strategies Based on DS and BF Policies: Here, the design of BA strategies based on both DS and BF policies is discussed. In particular, the optimization problem of finding the set of SBs B is investigated. The accuracy of the feedback sequence has considerable implications on the performance of BA strategies. For example, a wrong feedback message may cause to choose a beam that does not include any path for the use (e.g., for BF policy) or choose a considerably larger beam (e.g., for DS policy). Hence, it is important to minimize the possibility the erroneous feedback.

While it is easy to considerably reduce or for all practical purposes eliminate the possibility of error in a transmitted packet from/to the user by the means of channel coding, the error due to the incorrect coverage region of the beamformer directly translate to an error in the inferred feedback. It has been shown that a beamformer with regular beams, i.e., beams with single connected angular span, may be designed with sharp edges using large number of antennas. However, as the number of antennas decreases the edges become less sharp and will have smoother drop rate. Design of a beamformer with composite beams, i.e., the beams that are composed of multiple connected angular spans, is much more complicated. Considering the sharpness of the beam edges in a design of a regular beams as a function of the number of antenna, intuition may suggest that one can divide the number of antennas by the number of the connected angular regions for a composite beam and use such function in order to estimate the decay in the sharpness of the edges for the composite beams. However, the design of composite beams is more complicated due to interconnection of the coefficients and there might be unwanted spikes and more dominant side lobes for each such of the angular spans.

Therefore, as a practical constraint, one may consider using SBs that include a single connected angular span. Nonetheless, such beams may have intersections and any one of $2^b-1$ possible CBs may be generated. However, the set of such beams in two dimensional azimuth space allows not all but only a particular subset of such CBs to be realizable for a given set of SBs. Out of such realizable CBs, some are more appropriate for the BA strategies. In the following, a quantifying measure is provided to design SBs which leads to desirable CBs.

Definition 11. A feedback sequences is valid if and only if there is a possible path realization which lead to such feedback sequence.

Definition 12. The set of beam A is called distinguishable for a policy, if there exist a realizable set of CBs, and a set of valid feedback sequence that can generate A as a set of DTBs.

Theorem 13. The most distinguishable set, i.e., the set with the largest possible size, may be obtained through the Flower design defined by a set of single span $SB_s$ $B=\{\Phi_i\}$, $i \in [b]$, where each beam may only have intersection with its adjacent beams with the exception of $\Phi_1$ and $\Phi_b$ for which the intersection might be nonempty. This means $\Phi_i \cap \Phi_j = \emptyset$, $1<|i-j|<b$.

Definition 14. The connected Flower design is defined as a Flower design where $\Phi_i \cap \Phi_j \neq \emptyset$, $|i-j|=1$. The fully connected Flower design is defined as a Flower design where $\Phi_i \cap \Phi_j \neq \emptyset$, $|i-j|=1$ and $\Phi_1 \cap \Phi_b \neq \emptyset$.

The connected Flower design may be expressed as a set of beams $B=\{\Phi_i\}$, $i \in [b]$ represented by intervals where $\exists \theta$:

$\Phi_i=[\theta+x_i, \theta+\gamma_i]$, $x_{i+1}>x_i$, $i \in [b-1]$, $\gamma_{i+1}>\gamma_i$, $i \in [b-2]$, $x_{i+2}>\gamma_i>x_{i+1}$, $i \in [b-2]$, $x_b<\gamma_{b-1}<2\pi+x_1$, and $\gamma_b<2\pi+x_2$. The fully connected Flower design has an extra condition $2\pi+x_1<\gamma_b$.

The optimize solution to the problem of finding the most distinguishable set is obtained as follows: (1) If the search domain comprises a single angular interval $D=[0,2\pi)$ and all-zero feedback is not allowed, fully connected Flower design is optimal, but if all zero feedback is allowed the connected Flower design is optimal. (2) If the search domain includes a single angular interval $D=<[0,2\pi)$ connected Flower design is optimal. (3) If the search domain comprises multiple angular intervals Flower design is optimal.

It is to be noted that the DTBs in general may be a composite beam. However, the smoothness of the edges, more dominant side lobes, and possible spikes in the beamforming gain of a beamformer with composite beams is not detrimental for data transmission. Such artifacts simply affect the beamforming gain that is possible to achieve.

According to an aspect of the present invention, a computer-implemented method is provided for finding a data transmission beam from an Access Point (AP) to a User Equipment (UE) in a communication system. The method includes selecting a probing beam from a set of probing beams. The method further includes sending a plurality of probing packets from the AP to the UE using a dedicated probing beam selected for each probing packet from among the set of probing beams. The method also includes receiving feedback from the UE regarding the plurality of probing packets. The method additionally includes computing the data transmission beam based on the received feedback and the set of probing beams.

According to another aspect of the present invention, wherein each of the probing beams from the set of probing beams includes an angular coverage interval corresponding to a respective single contiguous main lobe from a set of single contiguous main lobes.

According to yet another aspect of the present invention, wherein an angular coverage of the data transmission beam includes an intersection of a union of angular coverage intervals of the probing beams with positive feedback and an intersection of a complement of the angular coverage intervals of the probing beams with negative feedback. Complement of the angular coverage interval has the usual meaning in the set theory, i.e., the angles which is not contained in a set A is in the complement of the set A.

According to still another aspect of the present invention, wherein the angular coverage of the data transmission beam includes an intersection of the angular coverage interval of a probing beam with positive feedback and an intersection of a complement of angular coverage intervals of the probing beams with negative feedback.

According to a further aspect of the present invention, wherein the angular coverage interval of the data transmission beam is minimized by selecting a positive feedback out of a set of positive feedbacks.

According to another aspect of the present invention, the method further includes using a composite beam for the data transmission beam wherein the composite beam covers a plurality of disjoint angular intervals.

According to yet another aspect of the present invention, wherein a transmitted power outside respective angular intervals from among the plurality of disjoint angular intervals is negligible with respect to the transmitted power inside the respective angular intervals.

According to still another aspect of the present invention, wherein a constraint is imposed such that respective single contiguous main lobes of no more than two probing beams from the set of probing beams overlap.

According to a further aspect of the present invention, wherein the set of probing beams is designed such that an expected measure of a size of a total coverage interval of the data transmission beam is minimized.

According to another aspect of the present invention, wherein the set of probing beams is designed based on prior knowledge about a communication channel between the AP and a plurality of UEs including the UE.

According to yet another aspect of the present invention, wherein the probing beams are adaptively designed to dynamically track changes in a communication channel between the AP and a plurality of UEs including the UE.

According to still another aspect of the present invention, wherein a composite beam is designed based on splitting a transmission packet into plurality of streams and using different beamformers for each of the plurality of streams.

According to a further aspect of the present invention, wherein the number of disjoint intervals of the composite beam in a set of composite beams used for the data transmission is less than a threshold.

According to another aspect of the present invention, wherein a threshold on a number of disjoint intervals of the composite beam is a function of a number of antennas used for the data transmission.

According to yet another aspect of the present invention, the method further includes using the composite beam for the probing.

According to still another aspect of the present invention, wherein the plurality of probing packets is sent using spatial multiplexing.

Reference in the specification to "one embodiment" or "an embodiment" of the present invention, as well as other variations thereof, means that a particular feature, structure, characteristic, and so forth described in connection with the embodiment is included in at least one embodiment of the present invention. Thus, the appearances of the phrase "in one embodiment" or "in an embodiment", as well any other variations, appearing in various places throughout the specification are not necessarily all referring to the same embodiment. However, it is to be appreciated that features of one or more embodiments can be combined given the teachings of the present invention provided herein.

It is to be appreciated that the use of any of the following "/", "and/or", and "at least one of", for example, in the cases of "A/B", "A and/or B" and "at least one of A and B", is intended to encompass the selection of the first listed option (A) only, or the selection of the second listed option (B) only, or the selection of both options (A and B). As a further example, in the cases of "A, B, and/or C" and "at least one of A, B, and C", such phrasing is intended to encompass the selection of the first listed option (A) only, or the selection of the second listed option (B) only, or the selection of the third listed option (C) only, or the selection of the first and the second listed options (A and B) only, or the selection of the first and third listed options (A and C) only, or the selection of the second and third listed options (B and C) only, or the selection of all three options (A and B and C). This may be extended for as many items listed.

The foregoing is to be understood as being in every respect illustrative and exemplary, but not restrictive, and the scope of the invention disclosed herein is not to be determined from the Detailed Description, but rather from the claims as interpreted according to the full breadth permitted by the patent laws. It is to be understood that the embodiments shown and described herein are only illustrative of the present invention and that those skilled in the art may implement various modifications without departing from the scope and spirit of the invention. Those skilled in the art could implement various other feature combinations without departing from the scope and spirit of the invention. Having thus described aspects of the invention, with the details and particularity required by the patent laws, what is claimed and desired protected by Letters Patent is set forth in the appended claims.

What is claimed is:

1. A computer-implemented method for finding a data transmission beam from an Access Point (AP) to a User Equipment (UE) in a communication system, the method comprising:
sending a plurality of probing packets from the AP to the UE using a probing beam selected for each probing packet from among a set of probing beams;
receiving feedback from the UE regarding the plurality of probing packets; and
computing the data transmission beam based on the received feedback and the set of probing beams, each of the probing beams from the set of probing beams comprising an angular coverage interval corresponding to a respective single contiguous main lobe from a set of single contiguous main lobes.

2. The computer-implemented method of claim 1, wherein an angular coverage of the data transmission beam comprises an intersection of a union of angular coverage intervals of the probing beams with positive feedback and an intersection of a complement of the angular coverage intervals of the probing beams with negative feedback.

3. The computer-implemented method of claim 1, wherein the angular coverage of the data transmission beam comprises an intersection of the angular coverage interval of a probing beam with positive feedback and an intersection of a complement of angular coverage intervals of the probing beams with negative feedback.

4. The computer-implemented method of claim 3, wherein the angular coverage interval of the data transmission beam is minimized by selecting a positive feedback out of a set of positive feedbacks.

5. The computer-implemented method of claim 1, further comprising using a composite beam for the data transmission beam wherein the composite beam covers a plurality of disjoint angular intervals.

6. The computer-implemented method of claim 5, wherein a transmitted power outside respective angular intervals from among the plurality of disjoint angular intervals is negligible with respect to the transmitted power inside the respective angular intervals.

7. The computer-implemented method of claim 1, wherein a constraint is imposed such that respective single contiguous main lobes of no more than two probing beams from the set of probing beams overlap.

8. The computer-implemented method of claim 1, wherein the set of probing beams is designed such that an expected measure of a size of a total coverage interval of the data transmission beam is minimized.

9. The computer-implemented method of claim 8, wherein the set of probing beams is designed based on prior knowledge about a communication channel between the AP and a plurality of UEs including the UE.

10. The computer-implemented method of claim 8, wherein the probing beams are adaptively designed to dynamically track changes in a communication channel between the AP and a plurality of UEs including the UE.

11. The computer-implemented method of claim 5, wherein the composite beam is designed based on splitting a transmission packet into plurality of streams and using different beamformers for each of the plurality of streams.

12. The computer-implemented method of claim 5, wherein the number of disjoint intervals of the composite beam in a set of composite beams used for the data transmission is less than a threshold.

13. The computer-implemented method of claim 12, wherein a threshold on a number of disjoint intervals of the composite beam is a function of a number of antennas used for the data transmission.

14. The computer-implemented method of claim 5, further comprising using the composite beam for the probing.

15. The computer-implemented method of claim 1, wherein the plurality of probing packets is sent using spatial multiplexing.

16. A base station for finding a data transmission beam from an Access Point (AP) to a User Equipment (UE) in a communication system, the base station comprising:
  a memory device for storing program code; and
  a processor device operatively coupled to the memory device for running the program code to:
    send a plurality of probing packets from the AP to the UE using a probing beam selected for each probing packet from among a set of probing beams;
    receive feedback from the UE regarding the plurality of probing packets; and
    compute the data transmission beam based on the received feedback and the set of probing beams, each of the probing beams from the set of probing beams comprising an angular coverage interval corresponding to a respective single contiguous main lobe from a set of single contiguous main lobes.

17. The base station of claim 16, wherein an angular coverage of the data transmission beam comprises an intersection of a union of angular coverage intervals of the probing beams with positive feedback and an intersection of a complement of the angular coverage intervals of the probing beams with negative feedback.

18. The base station of claim 16, wherein the angular coverage of the data transmission beam comprises an intersection of the angular coverage interval of a probing beam with positive feedback and an intersection of a complement of angular coverage intervals of the probing beams with negative feedback.

* * * * *